US006267209B1

United States Patent
Gross et al.

(10) Patent No.: US 6,267,209 B1
(45) Date of Patent: *Jul. 31, 2001

(54) BRAKE UNIT WITH A NON-METALLIC BRAKE DISC MADE OF CERAMIC AND A HUB MADE OF ANOTHER MATERIAL

(75) Inventors: Gerhard Gross, Böblingen; Tillman Haug, Uhdingen-Mühlhofen; Kolja Rebstock, Ulm; Christian Schwarz, Frankfurt, all of (DE)

(73) Assignee: Daimler-Benz Aktiengesellschaft, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/153,678

(22) Filed: Sep. 15, 1998

(51) Int. Cl.⁷ ............................. F16D 65/12; C09K 3/14; C08J 5/04
(52) U.S. Cl. ............................. 188/218 XL; 188/251 M; 188/251 A; 188/218 A
(58) Field of Search .................. 188/218 XL, 218 A, 188/73.2, 18 A, 73.1, 251 A, 251 M, 251 R; 192/70.11, 107 M, 107 T; 411/9, 15; 301/6.91, 6.8, 64.7; 428/307.7, 319.1

(56) References Cited

U.S. PATENT DOCUMENTS

| | | | |
|---|---|---|---|
| 3,685,623 | * 8/1972 | Bradshaw | 188/218 XL |
| 3,754,624 | * 8/1973 | Eldred . | |
| 3,854,373 | * 12/1974 | Romey . | |
| 4,166,521 | * 9/1979 | Okunishi et al. | 188/251 M |
| 4,815,572 | * 3/1989 | Froberg et al. | 188/251 M |
| 5,007,508 | * 4/1991 | Lacombe | 188/251 A |
| 5,277,479 | * 1/1994 | Koyama et al. | 301/6.91 |
| 5,584,372 | * 12/1996 | Eichelsbachern et al. . | |
| 5,765,667 | * 6/1998 | Röss et al. | 188/218 XL |
| 5,779,006 | * 7/1998 | Hyde et al. . | |
| 5,806,636 | * 9/1998 | Atmur et al. | 188/251 A |
| 6,035,978 | * 3/2000 | Metzen et al. | 188/218 XL |
| 6,042,935 | * 3/2000 | Krenkel et al. | 192/107 M |

FOREIGN PATENT DOCUMENTS

| | | |
|---|---|---|
| 1 775 685 | 9/1971 | (DE) . |
| 35 15 512 | 10/1986 | (DE) . |
| 41 29 600 | 3/1993 | (DE) . |
| 4438455 | * 5/1996 | (DE) . |
| 4438456 | * 5/1996 | (DE) . |
| 296 10 498 U | 10/1996 | (DE) . |
| 29710533 | * 1/1998 | (DE) . |
| 197 08 696 | 1/1998 | (DE) . |
| 19719634 | * 3/1999 | (DE) . |
| 0201760 | * 4/1986 | (EP) . |
| 0 300 756 | 1/1989 | (EP) . |
| 0718521 | * 10/1995 | (EP) . |
| 9507418 | * 3/1995 | (WO) . |
| 9613471 | * 5/1996 | (WO) . |
| 9641968 | * 12/1996 | (WO) . |
| 9722815 | * 6/1997 | (WO) . |

* cited by examiner

Primary Examiner—Douglas C. Butler
(74) Attorney, Agent, or Firm—Kenyon & Kenyon

(57) ABSTRACT

A brake unit having a brake disc of ceramic and a hub of a different material, which radially overlap one another with their mutually facing rims and are mechanically joined by a wreath-type rim of mounting bolts that axially penetrate the overlapping rims. The mounting bolts are uniformly included in the transmission of torque. Entrainment bores or slots provided in the brake disc are plastically lined with a metal or plastic sleeve, or the disc material is formed specifically to certain areas in this region as a plastically deformable C/C structure. A method is disclosed for manufacturing a partially ceramized molded article, in particular a brake disc having a C/C structure in the area of the entrainment bores or slots. A completely non-metallic brake unit and a method for its manufacture are also disclosed.

20 Claims, 4 Drawing Sheets

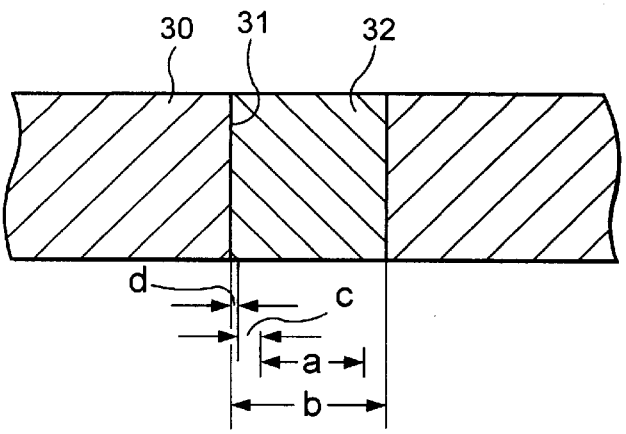
F I G. 5a
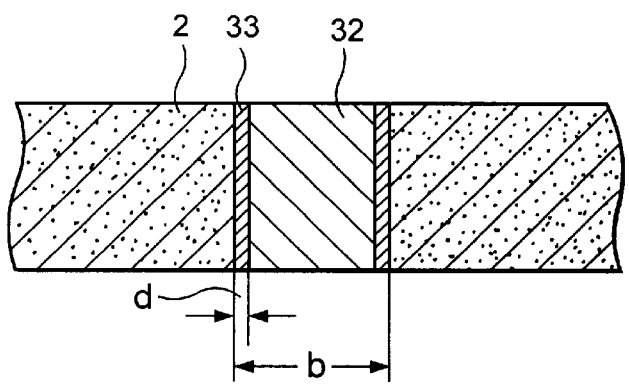
F I G. 5b
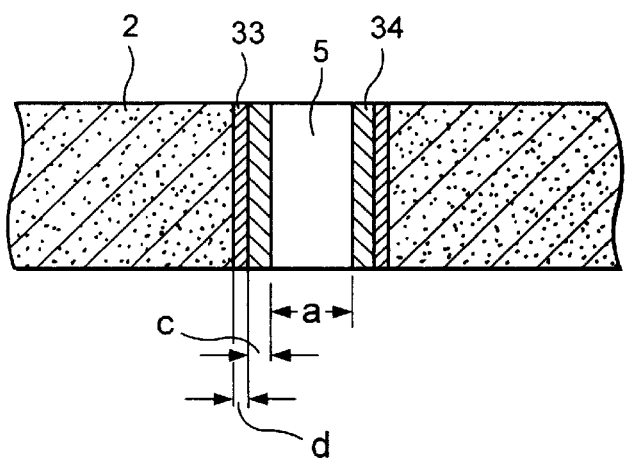
F I G. 5c

BRAKE UNIT WITH A NON-METALLIC BRAKE DISC MADE OF CERAMIC AND A HUB MADE OF ANOTHER MATERIAL

FIELD OF THE INVENTION

The present invention is directed generally to a brake unit having a nonmetallic brake disc of ceramic and a hub.

RELATED TECHNOLOGY

A brake unit and a manufacturing method are known, for example, from German Patent No. 44 38 455 C1 and from German Patent Application No. 44 38 456 A1. German Patent Application No. 44 38 456 A1 also describes a frictional unit, a frictional body, and a core body, the core body being able to have an extension prolongation with connection orifices in the manner of a nonmetallic hub. The frictional body is made of a C—C/SiC material, while the core body is constituted of a carbon fiber-reinforced carbon. The core body and the frictional body are joined by an interconnection layer containing essentially silicon carbide.

Brake units are also known, whose brake discs are constituted of carbon over their entire cross-section. Special measures are required to adapt a toroidally-shaped disc of this kind to the wheel hub. Provision has been made in known methods for a hat- or pot-shaped metal hub. This hub is mechanically coupled by its free rim to the brake disc. This mechanical coupling is achieved using a wreath-type rim of mounting bolts and corresponding entrainment bores or radial slots in the area of the inner rim or the inside of the brake disc, which produce a mechanically loadable form-locking between the brake disc and metal hub. Provision is usually made for six or eight mounting bolts.

What is problematic here is the difference between the expansion coefficient specific to the brake disc (about 3–5× $10^{-6}$/K) and that specific to the metal hub (about 15–20× $10^{-6}$/K). For that reason, one has to prevent the parts from sticking, as can occur due to the tension produced by this type of attachment. Rather, radial expansion must still be allowed between the two parts, in spite of the mechanical coupling. Therefore, a suitable play is intentionally permitted between the entrainment bores and the bolt in the radial direction, whereas a precise as possible fit with the bolt diameter is aspired to in the circumferential direction.

The predefined, hub-side position of the bolts, on the one hand, and the disc-side position of the entrainment bores, on the other hand, must, therefore, conform as precisely as possible. However, in spite of all efforts to achieve manufacturing precision, mathematical agreement can not be achieved with any kind of realistic cost outlay. Rather, in practice, it may not be possible to entirely avoid positional tolerances with respect to the bolts, on one hand, and the entrainment bores, on the other hand. As a result, merely two, at the most three, of all the provided bolts are load-bearing in response to mechanical stressing of the brake, whereas a play exists between the remaining bolts and the entrainment bores, preventing these bolts from bearing load.

After a plastic or wear-related deformation has taken place in the area of the bearing bolts, it is possible for the play existing in the area of the other bolts to be reduced, enabling these bolts to be load-bearing as well. When working with carbon discs, sufficient plasticity is given in the area of the entrainment bores, depending on the material used, so that in this case, at the latest following the first extreme mechanical stressing of the brakes, the initially sole three bearing bolts have pressed into the inside face of the corresponding entrainment bores, plastically deforming these bores, eliminating the play between the remaining bolts and their entrainment bores, thus rendering them load-bearing as well.

It is a different situation, however, with rigid ceramic discs. In the just described mechanical coupling between the brake disc and the metal hub, play may be eliminated for the non-bearing bolts, due to wear, or because of a plastic deformation of the bearing bolts; but this can take a very long time.

A solution to this problem, as described in the German Patent Application No. 44 38 456 A1, is to revert to a nonmetallic hub, which would lessen the differences with respect to the expansion coefficients. What is problematic, however, is securing the hub to the brake disc, due to the high mechanical and thermal stressing experienced during braking maneuvers.

SUMMARY OF THE INVENTION

An object of the present invention is to improve a brake unit having a nonmetallic disc of ceramic and a metal hub so that in spite of an inflexible ceramic disc, all of the bolts provided will be able to participate virtually uniformly in the transmission of the braking torque occurring at the brake disc, even without the bolts experiencing any plastic or wear-induced deformations. It is also an object of the present invention to provide an additional method for attaching a nonmetallic hub, as well as to provide a method for manufacturing brake units of this kind.

The present invention provides a brake unit (1) having a nonmetallic brake disc (2) of ceramic and a metallic hub (10, 10'), which radially overlap one another with their mutually facing rims and are mechanically joined by a wreath-type rim of mounting bolts (15) that axially penetrate the overlapping rims, in the area of its inner rim (3), the brake disc (2) having corresponding entrainment bores (5, 5') or radial entrainment slots to receive the mounting bolts (15), wherein the entrainment bores (5, 5') or entrainment slots are lined with a sleeve (20) of plastically deformable material, or the disc material is conceived to be plastically deformable to specific areas in this region. In the brake unit of the present invention having a metal hub, it is the region of the brake disc representing the inside face of the entrainment bore that is designed to be plastically deformable. This can be achieved, on the one hand, with the aid of a plastically deformable sleeve, or by using a plastic form of the normally rigid ceramic material. The effect of the plastic deformability is to compensate for the above-mentioned positional deviation of the bolts, on the one hand, and of the entrainment bore, on the other hand, in that the sleeve undergoes a deformation in response to mechanical stress, so that all bolts are load-bearing and undesired play no longer occurs.

Provision is made for a brake unit of the present invention having a nonmetallic hub for the hub to be molded into an inner region of the ceramic brake disc and doped with boron.

A soft metal sleeve may be used as a plastically deformable lining for the inside bore face. Sleeves of copper or aluminum, for example, are suitable. Instead of a metal sleeve, a sleeve of carbon fiber-reinforced plastic (CFK material) or carbon fiber-reinforced carbon (C/C material) may also be used. A nonmetallic CFK or C/C material of this kind is sufficiently plastically deformable. The sleeve is preferably slotted at one peripheral location over the entire length and fits with mechanical prestressing on the inside face of the bore or of the slot. The longitudinal slot makes the sleeve radially elastic, so that even under conditions of considerable temperature variations, accompanied by noticeable expansion or contraction, it fits with prestressing on the inner bore face.

The wall thickness of the sleeve is a function of the size of the brake disc or of the diameter of the bores. The wall thickness may typically be $\frac{1}{20}$ of the bore diameter. In the case of motor vehicle brake discs having a bore diameter of, for example, 15 mm, the wall thickness is about 0.75 mm; in the case of railroad brake units having a bore diameter of, for example, 200 mm, the wall thickness is about 10 mm.

It is a feature of a further embodiment of the present invention that the area immediately along the inner face of the entrainment bores or of the entrainment slots contains boron and/or boron-containing compounds and/or boron-releasing compounds in a locally limited fashion, this area being made of a non-ceramic C/C material, while the ceramic brake disc is made of C/C—SiC material. This embodiment is based on the realization that boron or boron-containing or boron-releasing compounds effectively prevent silicon carbide formation and ceramization during liquid siliconization. If the porous C/C preform, which is intended to undergo the liquid siliconization, is doped in certain regions with boron and/or boron compounds, then no ceramization takes place in this region. There is no "sleeve" as a separate structural element in this embodiment.

The same result is also achieved, however, when the entrainment bores or the entrainment slots are lined with a sleeve of carbon fiber-reinforced carbon, which contains boron and/or boron-containing compounds and/or boron-releasing compounds. At its periphery, the sleeve makes the transition to silicon carbide and thus forms a direct, or material-to-material bond with the C/C—SiC brake disc.

In both cases, the bore obtained has an inner face of C/C material, which gradually changes over to ceramic. Depending on the size of the brake disc or of the diameter of the entrainment bores or the entrainment slots, the radial layer thickness of this C/C material structure is preferably about $\frac{1}{20}$ of the bore diameter, in the case of motor vehicle brake discs, for example, from about 0.7 to 2.0 mm, in particular about 1.0 mm. Within these ranges, the boron and/or the boron-containing compounds are present in a concentration of from 5 to 35% by weight. Besides boron itself, suitable compounds are boron carbide, boron nitride, boron tetrachloride and/or borides, in particular zirconium diboride, hafnium diboride, silicon tetraboride and/or titanium diboride, as well as boron-containing polymers, in particular polyborosilazanes.

In principle, there are two different ways to couple the hub to the brake disc. The entrainment bores or the entrainment slots may be configured in the area of the inner rim of the brake disc, and hub may be provided with an outwardly projecting, flange-type rim that joins it to the inner rim of the brake disc. The coupling may also be achieved by configuring the entrainment bores in the inside area of the brake disc, and by joining the hub by its free end to the inner side of the brake disc.

A brake unit of the present invention that includes a ceramic brake disc and a nonmetallic hub has a brake disc of fiber-reinforced ceramic, preferably a C/C—SiC brake disc and a hub of the same fiber matrix, preferably a C/C hub. The hub is doped with boron and molded over an outwardly-projecting, flange-type rim into the inner side of the brake disc. Thus, the hub is made of a material which is not as damage-prone as the ceramic material of the brake disc, is less brittle, and easier to machine. The material permits greater expansion. On the other hand, a rigid hub is restricted in its use. Thus, the present invention provides for the hub to be integrally formed in the brake disc. An attachment of this kind provides for a high load-bearing capacity, for example, for braking maneuvers, since there is no longer a "rupture joint", as is the case with the prior interconnection layer.

In the method of the present invention for producing molded articles from fiber-reinforced C/C—SiC composite ceramic preforms are fabricated, which are doped with boron and/or with the mentioned boron compounds in those regions that are not designated for ceramization. The preforms can either be green compacts (thus preforms of CFK material) or the C/C bodies that result from pyrolysis of the green compacts.

Alternatively, fabricate green compacts, which correspond to the particular intended partial areas, may be fabricated as separate preforms. The green compacts corresponding to the partial areas not designated for ceramization, or the C/C members resulting from pyrolysis thereof, are doped using boron and/or the mentioned boron compounds and are joined, at the latest prior to the siliconization, to form the desired molded articles.

An advantage of the first alternative is that doping the bore regions eliminates the need for the entrainment bores to be drilled prior to the liquid siliconization. Rather, the brake disc can be mechanically machined in a uniform fashion, with respect to the entrainment bores as well, subsequent to the ceramization.

A second alternative of the method of the present invention provides for the entrainment bores to be drilled, at the latest, before the liquid siliconization takes place. Boron-doped sleeves or solid bodies are then inserted into the bores. This alternative provides easy control of the infiltration depth and boron doping. The initial products are either green compacts (i.e., CFK bodies) or already pyrolyzed, non-ceramic C/C bodies, in any desired combination. Thus, CFK brake discs can be combined with CFK- or C/C-sleeves or solid bodies. C/C brake discs may also be combined with CFK- or C/C-sleeves or solid bodies. The sleeves or solid bodies may be doped both in the CFK phase as well as in the C/C phase.

During the liquid siliconization, only a small portion of the silicon penetrates into the rim area of the now pyrolyzed sleeve or of the solid body and thus leads to a direct bonding between the sleeve or solid body and brake disc. Due to the boron doping, the doped sleeve or the doped solid body is not siliconized, but rather remains as a non-ceramic C/C workpiece. If a solid body is used, it needs only to be subsequently provided with a bore. A solid body or a bolt is more easily fabricated than a sleeve, and is less sensitive to handling. A benefit of the method of the present invention is that partial areas of a molded article can be targeted for ceramization. The boron-doped partial areas remain as non-ceramic areas, and are able to be more easily reworked. They permit a greater expansion than the ceramized partial areas, are not damage-prone, and are less brittle.

A method of the present invention is, therefore, suited for manufacturing one-piece brake units of a brake disc and of a non-metallic hub when the brake disc is a C/C—SiC brake disc and the hub is a C/C hub. In this case, the brake disc and the hub are manufactured separately, for example, as green compacts, with the green compact to be machined into the hub being doped with boron. The two parts are then joined, pyrolyzed, and ceramized, i.e., siliconized. The hub escapes the ceramization process because of the boron doping and, thus, remains moldable as a C/C component, while the brake disc is ceramized, the silicon penetrating into the rim area of the hub and, in this manner, ensuring a direct bonding. The green compacts are preferably joined by premolding the brake disc directly on the flange-type rim of the hub.

Another embodiment of a method for manufacturing nonmetallic brake units provides for two preforms for the brake disc. This is particularly advantageous when working with ventilated brake discs which have two disc halves interconnected by crosspiece segments. The two disc halves and the hub are fabricated separately as green compacts and pyrolyzed into C/C molded articles. The two brake disc halves are then joined along a flange-type rim of the hub, and the resulting brake unit is siliconized. Since the hub is doped with boron, it is not ceramized. A small portion of the silicon penetrates, however, into the rim area of the hub and ensures direct bonding.

The boron doping may be undertaken using a plurality of methods. On the one hand, boron and/or the mentioned boron compounds may be worked into the green compact as fillers. On the other hand, the porous C/C molded articles may be partially saturated with boron and/or boron compounds, or coated along the pore walls. The boron or the boron compounds may be introduced out of the liquid phase or out of the gas phase under high pressure.

BRIEF DESCRIPTION OF THE DRAWINGS

Exemplary embodiments of the present invention are described in greater detail in the following on the basis of the drawings, in which:

FIGS. 5a, 5b and 5c show schematic representations of a portion of a brake disc according to the present invention at method steps of the method of the present invention for manufacturing a bore lined with C/C material;

DETAILED DESCRIPTION

Figure 1:
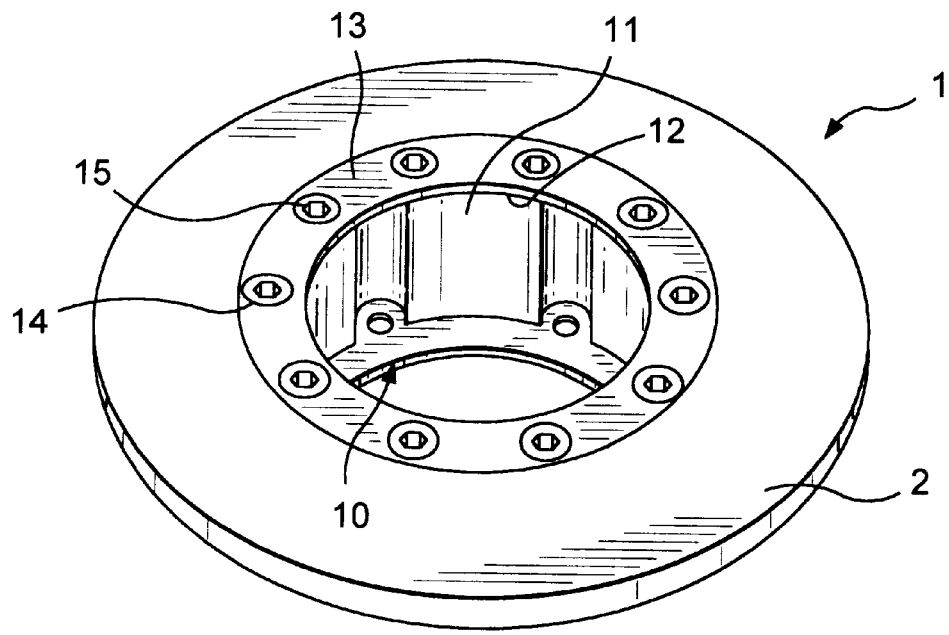
FIG. 1 shows a first exemplary embodiment of a brake unit of the present invention including a nonmetallic brake disc and a metal hub.

FIG. 1 illustrates a first exemplary embodiment of a brake unit 1 including a nonmetallic brake disc 2 and a metal hub 10. Brake disc 2 is ring-shaped and has a center opening. Metal hub 10 is hat-shaped and has a cylindrical area 11, which extends through the center opening of brake disc 2. Joined to free end 12 of this cylindrical area is an outwardly projecting, flange-type rim 13, which is provided with bores 14. Mounting bolts 15 extend through bores 14 and through corresponding bores 5 (see FIG. 3) or radial slots (not visible here) in the area of an inner rim of brake disc 2.

Figure 2:
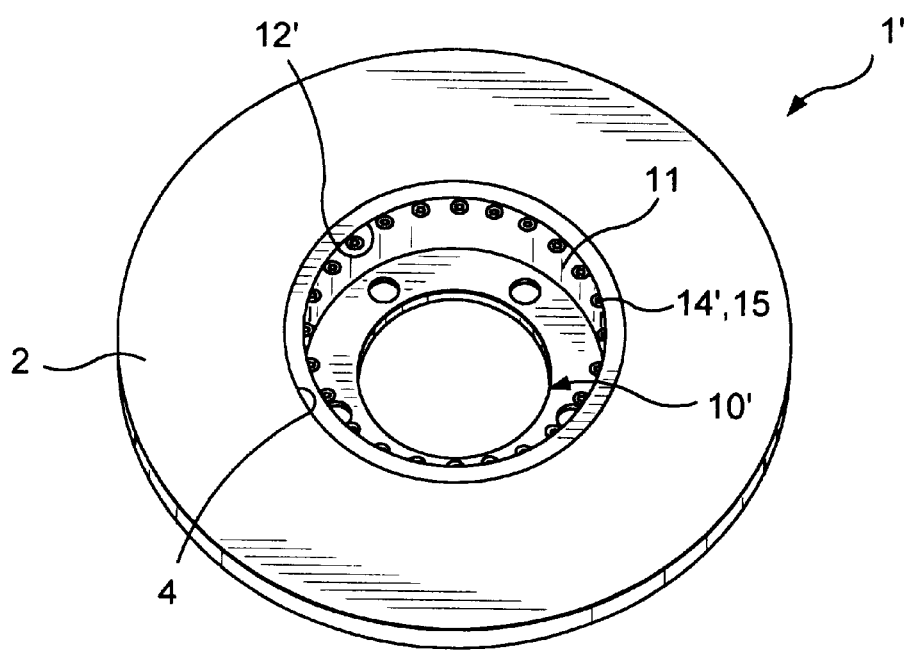
FIG. 2 shows another exemplary embodiment of a brake unit of the present invention including a nonmetallic brake disc and a metallic hub.

FIG. 2 illustrates another exemplary embodiment of a brake unit 1' of the present invention, including a metal hub 10'. In this instance, it is a so-called "floating" mounting attachment. Here, cylindrical area 11' of hub 10' does not have any flange. Provision is made, instead, for a number of bores 14' on its free end 12'. Mounting bolts 15 extend through these bores 14' and through corresponding bores (not visible here), which in this case are provided on inner circumference 4 of brake disc 2.

Figure 3:
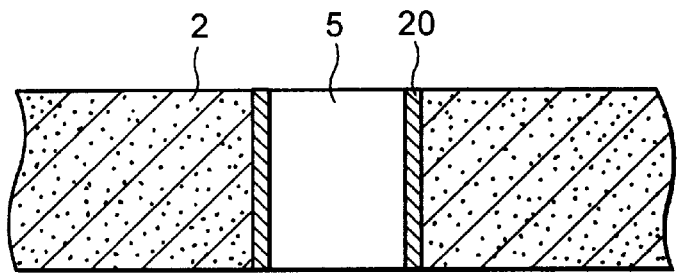
FIG. 3 shows a longitudinal section through an entrainment bore in the brake disc shown in FIGS. 1 and 2, including a metal sleeve.
Figure 4A:
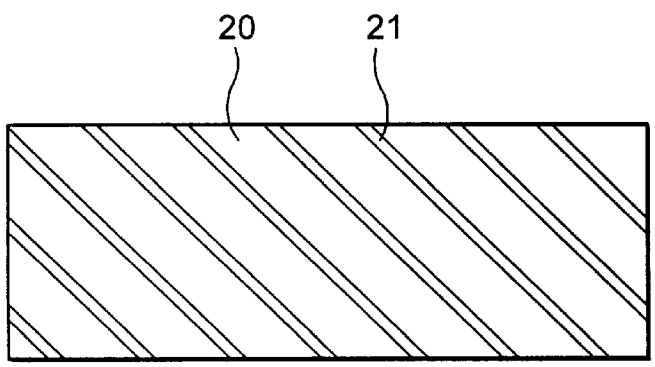
FIGS. 4a, 4b and 4c show schematic representations of metal sleeves of the present invention, including various peripheral slots.
Figure 4B:
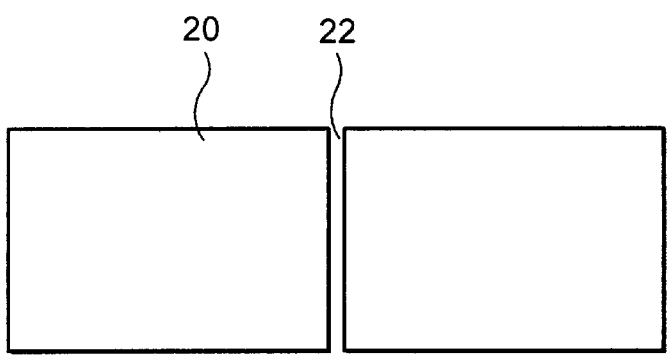
Figure 4C:
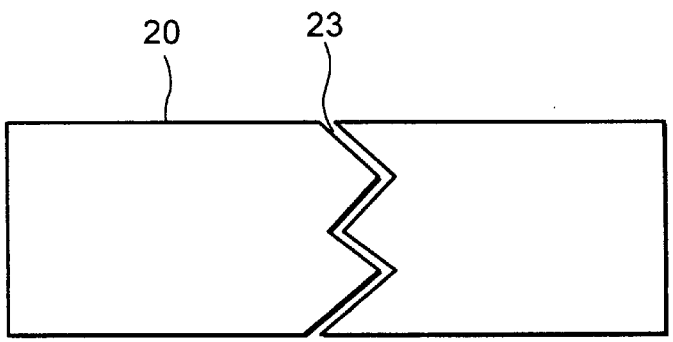

The present invention provides for the bores to be plastically lined on an inner circumference or on an inner rim of brake disc 2. FIG. 3 shows a schematic section, not true-to-scale, through such a bore 5, which is lined with a metal sleeve 20. Metal sleeve 20 is made of copper having a wall thickness of about 1 mm. Metal sleeve 20 is, as is evident from FIGS. 4a–c, provided with a slot that runs overs its entire surface height. The slot may have a screw-thread configuration (slot 21 in FIG. 4a); however, it may also run exactly perpendicularly to the surface (slot 22 in FIG. 4b); it is likewise possible that it follows a zigzag path (slot 23 in FIG. 4c).

The sleeve shown in FIG. 3 can also be fabricated from a CFK or a C/C material. These materials exhibit greater expansion than ceramic. They are not damage-prone and are easier to machine. Corresponding slots 21, 22, 23 may also be provided.

When working with brake discs of C/C—SiC material, provision is made according to the present invention for the area directly adjacent to the bores to be able to be doped with boron or boron-containing or boron-releasing compounds. A method for producing C/C—SiC molded articles is generally known. Carbon fibers, fillers and pyrolyzable, liquid binding agents are homogenized and compressed into a green compact of CFK material, the binding agent hardening in the process. The green compact is pyrolyzed into a porous C/C molded article, the binding agent being converted into carbon. The C/C molded article is saturated with liquid silicon and ceramized under a vacuum, at high temperatures, the carbon being completely or partially converted into silicon carbide.

The green compact or the porous foreign body obtained following pyrolysis is brought into contact with the mentioned boron-containing substances, in those regions where the intention is to place the bores. This is achieved, for example, by saturating the drilling areas with boron-containing substances and with solutions thereof. It is likewise possible for the boron-containing substances to be deposited out of the gas phase under high pressure, in a spot-type application. Thus, the pores of the C/C body may be coated, for example. In this context, one can also employ known CVD processes, e.g., to deposit $BN_3$ out of a mixture of $BCl_3/NH_3/H_2$ at 1000–1400° C. or $ZrB_2$ out of a mixture of $ZrCl_4/BCl_3/H_2$ at 1000–1500° C.

Following the ceramization, these regions remain as uninfiltrated, porous C/C bodies, since the boron doping effectively prevents a ceramization. The undoped regions, however, are infiltrated with silicon and ceramized, SiC being partially or predominantly formed. The bores are subsequently provided in these regions, since these regions unlike the ceramized regions—are easier to machine. The bores have a smaller diameter than the doped regions, so that a rim area, which takes on the sleeve function, remains as a non-ceramized C/C region.

FIGS. 5a through c schematically depict how, in accordance with another variant of the method of the present invention, a region that does not ceramize during liquid siliconization, in the area of the bores of brake disc 2, may be produced. Preferable, in the exemplary embodiment a bore 5 having a diameter (a) and a lining having wall thickness (c) (compare FIG. 5c) is produced. Following fabrication of the green compact or subsequent to pyrolysis, region (c)-(a)-(c) may be doped, as noted above, with boron or boron compounds. Following siliconization and ceramization, region (a) is then bored, because it has retained its C/C structure and is easier to machine.

Provision is preferably made, however, for a bore 31 having diameter (b) to be inserted into a preform 30 before (or after) pyrolysis. Diameter (b) of bore 31 is larger than diameter (a) of the later resulting entrainment bore 5. As proceeds from FIG. 5a, diameter (b) also includes thickness (c) for the subsequent sleeve, as well as a narrow region (d) for the direct bonding effected by the siliconization. In this exemplary embodiment, preform (30) is a green compact; however, it can also be a C/C body.

A solid body 32, which is doped with boron or boron compounds, is inserted as a green compact into bore 31. The boron or the boron compounds are added as filler during fabrication of the green compact (solid body 32) in concentrations of 5–35% by weight. The volumetric fiber component is about 30–60% by volume, preferably about 40% by volume. The mass ratio of graphite filler to boron compounds is 1:1 or less, the graphite being replaced by fibers.

After placement of solid body 32, if indicated, preform 30 undergoes pyrolysis and liquid siliconization. The result is shown schematically in FIG. 5b. At this point, brake disc 2 is ceramized, the silicon also having penetrated into a narrow wall area 33 of full body 32, and thus leading to a direct bonding between solid body 32 and brake disc 2. Solid body 32 itself has a C/C structure; it is pyrolyzed, but not ceramized.

Solid body 32 is now provided with bore 5 having diameter (a). In the process, a rim region 34 of solid body 32 remains, since it had been selected to be larger than bore 5. This rim region 34 of solid body 32 now constitutes the lining or sleeve of bore 5 of brake disc 2.

Figure 6A:
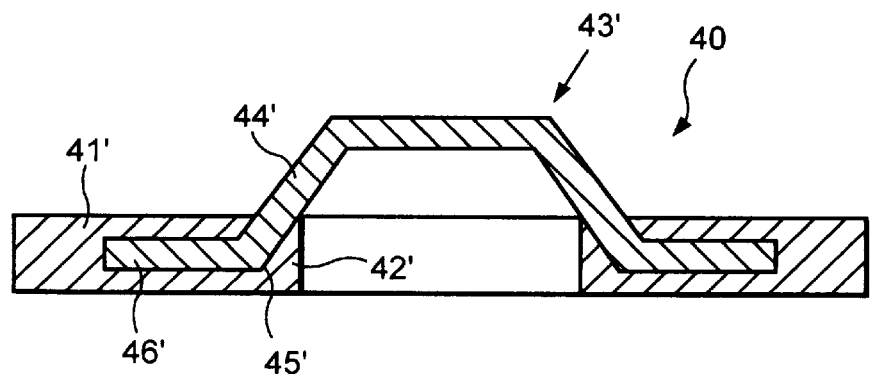
FIGS. 6a and 6b show schematic sectional views of a brake unit of the present invention including a C/C hub and a C/C—SiC brake disc prior to (FIG. 6a) and subsequent to (FIG. 6b) the liquid siliconization.
Figure 6B:
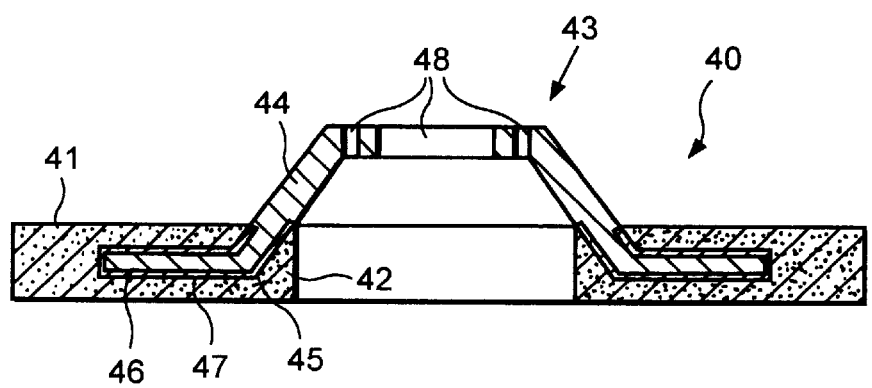

In similar fashion, brake units 40, including a brake disc 41 and a nonmetallic hub 43, may also be to be manufactured when brake disc 41 to be made of a C/C—SiC material and hub 43 of a C/C material (FIGS. 6a, 6b). Two green compacts are fabricated; namely brake-disc preform 41' and hub preform 43'. Hub preform 43' similarly has a cylindrical region 44' and, on its free end 45', a flange-type rim 46' (FIG. 6a).

According to one preferred method, hub preform 43' is first fabricated. Brake-disc preform 41' is subsequently pressed around its rim 46'. In this manner, rim 46' is molded into inner region 42' of the brake disc. Hub preform 43' is doped with boron in the previously-described manner. The entire brake unit 40 then undergoes pyrolysis and liquid siliconization.

The result is schematically shown in FIG. 6b. Brake disc 41 is siliconized and ceramized. The silicon has penetrated into a narrow region 47 of rim 46 of hub 43, ensuring a secure, direct bonding between hub 43 and brake disc 41. Hub 43 itself is molded into inner region 42 of brake disc 41. It is not ceramized, but is constituted of a non-ceramic, C/C material, which can easily be reworked, e.g., provided with bores 48.

Figure 7:
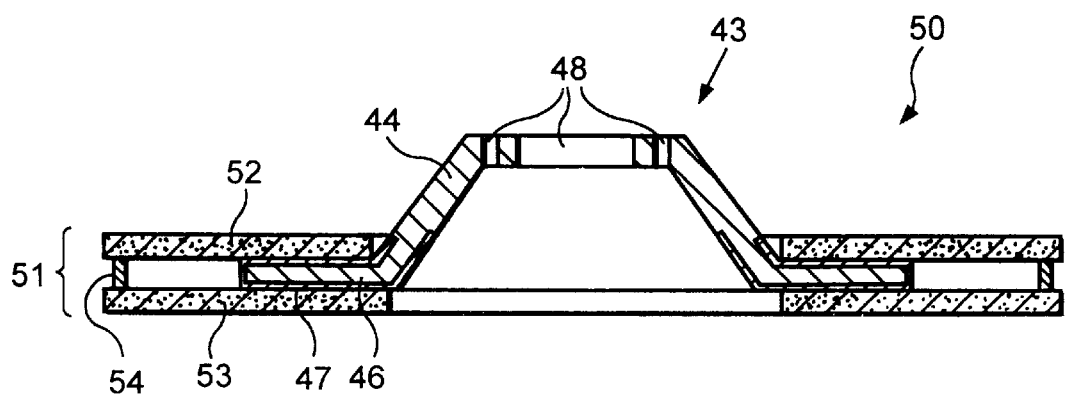
FIG. 7 shows a schematic sectional view of a brake unit of the present invention including a C/C hub and a C/C—SiC brake disc subsequent to the liquid siliconization.

FIG. 7 depicts a brake unit 50 having ventilated brake discs 51. Brake discs 51 are constituted by two interconnected preforms 52, 53, joined by crosspiece segments 54. Here, the preforms for the brake disc halves and hub 43 are initially fabricated and pyrolyzed, the hub preform being doped with boron. Both preforms for the brake disc halves are subsequently joined above and below rim 46 of hub 43. The entire brake unit is then ceramized using liquid siliconization, the brake disc halves being permanently joined together along their crosspiece segments 54 by direct bonding. Hub 43 is not ceramized. However, silicon presses into rim 47 of hub 43 and thus ensures a permanent, direct bonding between hub 43 and brake disc 51.

What is claimed is:

1. A brake unit comprising:
   a nonmetallic brake disc including ceramic material and including a first inner rim; the brake disc having bores or slots;
   a metallic hub including a second rim facing and radially overlapping the first inner rim; and
   a wreath-shaped configuration of mounting bolts axially penetrating the first inner and the second rims, the mounting bolts being received in the bores or slots;
   wherein each of the bores or slots are lined with a sleeve including a plastically deformable material or wherein the disc at areas of the bores or slots is plastically deformable.

2. The brake unit as recited in claim 1 wherein the sleeve includes soft metal.

3. The brake unit as recited in claim 2 wherein the soft metal includes at least one of copper and aluminum.

4. The brake unit as recited in claim 1, wherein the sleeve includes at least one of carbon fiber-reinforced plastic and carbon fiber-reinforced carbon.

5. The brake unit as recited in claim 1 wherein the sleeve includes at least one second slot at a peripheral location over a length of the sleeve and is adapted to fit with a mechanical prestressing on an inside face of a respective one of the bores or slots.

6. The brake unit as recited in claim 5 wherein the at least one second slot is configured as at least one of a surface line, a screw-thread line, and a zigzag line.

7. The brake unit as recited in claim 1 wherein the sleeve has a wall thickness of about 1/20 of a diameter of the bore or slot.

8. The brake unit as recited in claim 1 wherein the ceramic material is a C/C—SiC material, and wherein an area adjacent to the bores or slots includes at least one of boron, boron-containing compounds and boron-releasing compounds in a locally limited fashion so as to form a non-ceramic C/C material.

9. The brake unit as recited in claim 8 wherein at least one of the boron-containing compounds and boron-releasing compounds includes at least one of boron carbide, boron nitride, boron tetrachloride, borides and boron-containing polymers.

10. The brake unit as recited in claim 9 wherein the borides include at least one of $ZrB_2$, $HfB_2$, $SiB_4$ and $TiB_2$ and the boron-containing, polymers include polyborosilazanes.

11. The brake unit as recited in claim 8 wherein at least one of the boron, the boron-containing compounds and the boron-releasing compounds are included in a concentration of from 5 to 35% by weight.

12. The brake unit as recited in claim 8 wherein the non-ceramic C/C material area has a radial layer thickness of about 1/20 of a diameter of one of the bores or slots.

13. The brake unit as recited in claim 1 wherein the ceramic material is a C/C—SiC material, and wherein:
   the sleeve includes carbon fiber-reinforced carbon and at least one of boron, boron-containing compounds and boron-releasing compounds; and the sleeve at a periphery includes a transition to silicon carbide so as to form a direct bond with the brake disc.

14. The brake unit as recited in claim 13 wherein at least one of the boron-containing compounds and boron-releasing compounds includes at least one of boron carbide, boron nitride, boron tetrachloride, borides and boron-containing polymers.

15. The brake unit as recited in claim 14 wherein the borides include at least one of $ZrB_2$, $HfB_2$, $SiB_4$ and $TiB_2$ and the boron-containing polymers include polyborosilazanes.

16. The brake unit as recited in claim 13 wherein at least one of the boron, the boron-containing compounds and the boron-releasing compounds are included in a concentration of from 5 to 35% by weight.

17. The brake unit as recited in claim 13 wherein the sleeve has a radial layer thickness of about 1/20 of a diameter of the bore or slot.

18. The brake unit as recited in claim 1 wherein the bores or slots are provided in an area of the first inner rim, and wherein the hub further includes an outwardly projecting flange-type rim joining the hub to the first inner rim.

19. The brake unit as recited in claim 1 wherein the brake disc further includes an inner side, the bores being provided in an area of the inner side and wherein the hub includes a free end joining the hub to the inner side of the brake disc.

20. A brake unit comprising:

a brake disc including fiber-reinforced ceramic material;

a hub including a fiber matrix the same as a fiber matrix of the fiber-reinforced ceramic material, the hub including at least one of boron, boron-containing compounds and boron-releasing compounds;

wherein the brake disc and the hub are joined so as to form a bond and a transition region, the fiber matrix of the hub transitioning to the fiber matrix of the fiber-reinforced ceramic material, the fiber matrix of the hub transitioning to silicon carbide in the transition region.

* * * * *